US010022872B2

(12) United States Patent
Fadlovich et al.

(10) Patent No.: US 10,022,872 B2
(45) Date of Patent: *Jul. 17, 2018

(54) SELF-CONTAINED MODULAR MANUFACTURING TOOL RESPONSIVE TO LOCALLY STORED HISTORICAL DATA

(71) Applicant: MOBILE TOOL MANAGEMENT, INC., Mukilteo, WA (US)

(72) Inventors: Chace Howard Fadlovich, Bothell, WA (US); Robert Allen Brown, Denver, CO (US); David James Whalen-Robinson, Mountlake Terrace, WA (US); Michael Gary Woogerd, Seattle, WA (US); Eric J. Davis, Mukilteo, WA (US)

(73) Assignee: MTM Robotics, LLC, Mukilteo, WA (US)

( * ) Notice: Subject to any disclaimer, the term of this patent is extended or adjusted under 35 U.S.C. 154(b) by 298 days.

This patent is subject to a terminal disclaimer.

(21) Appl. No.: 14/876,508

(22) Filed: Oct. 6, 2015

(65) Prior Publication Data

US 2017/0095931 A1    Apr. 6, 2017

(51) Int. Cl.
G06F 19/00 (2018.01)
B25J 11/00 (2006.01)
(Continued)

(52) U.S. Cl.
CPC ............... B25J 11/005 (2013.01); B25J 9/08 (2013.01); B25J 9/1687 (2013.01);
(Continued)

(58) Field of Classification Search
CPC ..................................................... B25J 11/005
(Continued)

(56) References Cited

U.S. PATENT DOCUMENTS 5,740,328 A * 4/1998 Ravani .................. B25J 9/1692
                                              318/568.16
5,969,976 A   10/1999 Bourne et al.
(Continued)

OTHER PUBLICATIONS

Bischoff, Rainer, et al. "The KUKA-DLR Lightweight Robot arm-a new reference platform for robotics research and manufacturing." Robotics (ISR), 2010 41st international symposium on and 2010 6th German conference on robotics (ROBOTIK). VDE, 2010.pp. 741-748.*

(Continued)

Primary Examiner — Satish Rampuria
(74) Attorney, Agent, or Firm — Lane Powell, PC; Kevin D. Jablonski

(57) ABSTRACT

A system and method for using locally stored historical performance data with a self-contained modular manufacturing device having modular tools and parts configured to collectively accomplish a specific task or function. In an embodiment, the modular device includes an interface configured to communicate with a remote control system capable of control the robotic arm. The modular device also includes one or more other modules that are configured to accomplish a particular task or function. Such modules are sometimes called end-effectors and work in conjunction with each other to accomplish tasks and functions. In a self-contained modular manufacturing device, a processor disposed in the housing may be configured to control the functional tools (e.g., each end-effector) independent of the overall manufacturing control system. Further, historical data may be locally stored and retrieved to tailor the functioning of the modular device.

10 Claims, 5 Drawing Sheets

(51) Int. Cl.
  *B25J 9/16*     (2006.01)
  *G05B 19/418*    (2006.01)
  *B25J 15/00*    (2006.01)
  *B25J 9/08*     (2006.01)

(52) U.S. Cl.
  CPC ....... *B25J 15/0019* (2013.01); *B25J 15/0057* (2013.01); *G05B 19/41815* (2013.01); *Y10S 901/02* (2013.01); *Y10S 901/41* (2013.01)

(58) Field of Classification Search
  USPC .................................................. 700/157–196
  See application file for complete search history.

(56) References Cited

U.S. PATENT DOCUMENTS

| | | | | |
|---|---|---|---|---|
| 8,841,118 | B2* | 9/2014 | Robinson | ................. C12Q 1/04 435/287.1 |
| 2010/0262287 | A1* | 10/2010 | Ha | ......................... B25J 9/161 700/248 |
| 2015/0273604 | A1* | 10/2015 | Anderson | ............ B23K 1/0056 228/102 |
| 2017/0249729 | A1* | 8/2017 | Greene | ................ G01B 21/047 |

OTHER PUBLICATIONS

Culler, David E., and William Burd. "A framework for extending computer aided process planning to include business activities and computer aided design and manufacturing (CAD/CAM) data retrieval." Robotics and Computer-Integrated Manufacturing 23.3 (2007): pp. 339-350.*

Ng, Amos HC, et al. "Virtual manufacturing for press line monitoring and diagnostics." International Journal of Machine Tools and Manufacture 48.5 (2008): pp. 565-575.*

International Search Report & Written Opinion dated Dec. 16, 2016; Int'l Application No. PCT/US16/53044; Int'l Filing Date Sep. 22, 2016: pp. 1-13.

A Dual-Arm Dextrous Manipulator System with Anthropomorphic Kinematics.

* cited by examiner

SELF-CONTAINED MODULAR MANUFACTURING TOOL RESPONSIVE TO LOCALLY STORED HISTORICAL DATA

RELATED APPLICATION DATA

The present application is related to U.S. patent application Ser. No. 14/876,508, entitled SELF-CONTAINED MODULAR MANUFACTURING TOOL filed Oct. 6, 2015; is related to U.S. patent application Ser. No. 14/876,443, entitled SYSTEM AND METHOD FOR SELF-CONTAINED SELF-CALIBRATING MODULAR MANUFACTURING TOOL filed Oct. 6, 2015; is related to U.S. patent application Ser. No. 14/876,564, entitled SYSTEM AND METHOD FOR SELF-CONTAINED MODULAR MANUFACTURING DEVICE HAVING NESTED CONTROLLERS filed Oct. 6, 2015; and is related to U.S. patent application Ser. No. 14/876,603, entitled SYSTEM AND METHOD FOR SELF-CONTAINED INDEPENDENTLY CONTROLLED MODULAR MANUFACTURING TOOLS filed Oct. 6, 2015, all of the foregoing applications are incorporated herein by reference in their entireties.

BACKGROUND

As manufacturing environments become more automated and complex, robotics and other automated machinery is becoming more and more prevalent in all phases of manufacturing. Very specific tasks that are conventionally performed by a skilled artisan may be performed using highly specialized robotics having highly specialized tools and/or end effectors. For example, drilling holes in composite sections of a contoured section of an airplane wing or car body may require a high level of precision with respect to applying torque to a motor for moving the end effector around a contoured wing surface. A further example is the need to tightly control the actuation force applied to the wing section by the drill bit in order to avoid compromising the wing itself.

In conventional manufacturing environments, various end-effectors and other tools that are used to accomplish various functions are simply controllable tools that are mounted to the end of a robotic arm or other form of actuator such that a central control system controls end-effectors according to a master logic program or state machine. That is, the tool itself does not contain any manner of processing ability such that the tool may be deemed to be a "smart tool" capable of directing its own functions in a self-contained manner. Rather, conventional systems include master programs that exhibit control functionality to tools through control signal communications propagating through robotic arms and actuators. In such a conventional environment, lack of localized processing and control imposes large processing speed and power requirements on the master control system.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

Figure 1:
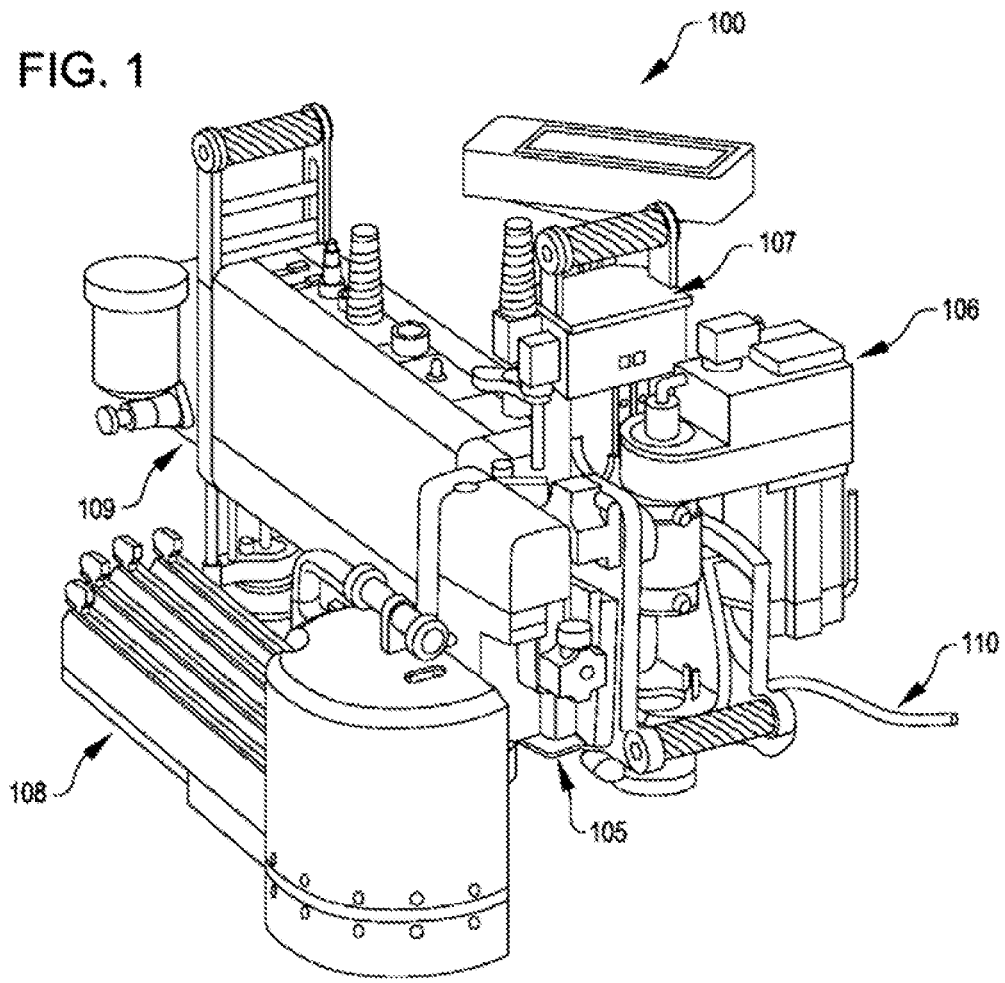
FIG. 1 shows an isometric view of a set of modular tools forming a self-contained modular manufacturing device having a local processor for executing processing instructions independent of an overall manufacturing control system according to an embodiment of the subject matter disclosed herein.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

The subject matter disclosed herein is directed to a system (and method for use thereof) of a self-contained modular manufacturing device having modular tools and parts configured to collectively accomplish a specific task or function. In an embodiment, the modular device includes a housing that has a mount configured to engage a robotic arm or other form of maneuvering actuator (such a crane or gantry). The housing may provide a base by which additional modules may be mounted and coupled. The modular device also includes an interface configured to communicate with a remote control system capable of control the robotic arm. The modular device also includes one or more other modules that are configured to accomplish a particular task or function. Such modules are sometimes called end-effectors and work in conjunction with each other to accomplish tasks and functions. In a self-contained modular manufacturing device, a processor disposed in the housing may be configured to control the functional tools (e.g., each end-effector) independent of the overall manufacturing control system. Further, the self-contained modular manufacturing device may be configured to calibrate itself with respect to other attached modules or with respect to an underlying manufactured item. Further yet, the self-contained modular manufacturing device may be configured to store data in a memory about functions that have been performed as well as alter functionality based on past performance and other historical data.

As foreshadowed in the background, a conventional robotic manufacturing system may include arm and actuators to which are attached end-effectors and other tooling. Under a master control system or master control operator, the robot arm may move the end effector into position where the end effector performs the actual machining or assembly of the parts. For example, to fasten two pieces of metal together, a human operator loads the two pieces of metal into the tooling, and, after the operator retreats to a safe distance from the robot, the operator pushes a button, or otherwise indicates to the robot that the robot can begin the fastening process. Then, under the control of the master control system, the end-effector drills one or more holes through the two pieces of metal, inserts fasteners (e.g., rivets) into the holes, and installs the fasteners. During the fastening operation, the robot may move the end-effector from hole position to hole position, or the robot may be installed on a device (e.g., a rail) that moves the robot from hole position to hole position. Alternatively, the tooling may move the two pieces of metal relative to the end effector, or may be installed on a device (e.g., a rail or Automatic Guided Vehicle (AGV)) that moves the tooling. After the two pieces of metal are fastened together, the operator removes the fastened pieces from the tooling, and repeats the above procedure starting with loading another two pieces of metal into the tooling.

Alternatively, where the pieces (e.g., pieces of an airplane wing) are too large to be moved by a human operator, they may be moved and loaded into the tooling with machinery (e.g., heavy equipment), or the robot may be moved to the location of the pieces instead of the pieces being moved to the location of the robot.

The robot and the end effector, in a conventional system, are controlled by a master control system and often through a central Programmable Logic Controller (PLC). The PLC executes a software program to directly control all of the operations of the robot and the end effector, and to store information regarding the robot and end effector. For example, to drill a hole, the PLC may access and execute a drill-hole software subroutine or object (or the PLC may be a state machine) that causes the PLC to generate one or more electrical analog or digital signals that are coupled to the end effector. These signals (e.g., drill on/off, drill speed, drill extend/retract) cause the drill motor to rotate the drill bit at a desired speed and to drill a hole. And the PLC may receive feedback signals (e.g., drill depth, drill speed) from feedback sensors so that the PLC can operate the items (e.g., drill) of the end effector in open loop or closed loop. The PLC may also receive monitoring signals (e.g., temperature) from sensors so as to take corrective action if there is a problem (e.g., overheating, short circuit).

But there are disadvantages to such a central control system. Because the PLC controls all operations of the robot and end effector, the software program (or state machine) that the PLC executes may be long, complex, unwieldy, and difficult and time consuming to update. For example, suppose a small change or update needs to be made to the drilling subroutine. A programmer may need to access, modify, recompile, debug, and reinstall the entire program just for this small change. And the debug may include testing the program on the entire manufacturing system, not just on the end effector, so that either the entire manufacturing system is down during this software update, or a separate robotic system or robot-system emulator needs to be purchased and maintained just for software updates.

Furthermore, because the PLC needs to generate many analog or digital signals to control the end effector, the connector (e.g., "umbilical cord") between the PLC and the end effector may be large and complex, and, due to the number of individual connections, may be unreliable. For example, such a connector may have from tens to hundreds of individual connection pins and receptacles. Moreover, because the PLC needs to calibrate the end effector, swapping out an end effector is anything but trivial. For example, the PLC may calibrate open-loop offsets (e.g., previously calculated and stored drill-position offset, camera-position offset) based on a look-up table (LUT) that is unique to the end effector. For example, the PLC may match a serial number of the end effector with the proper LUT to make sure that the PLC is using the correct calibration offsets for that particular end effector. Therefore, when swapping out an end effector, the maintenance person may need to load the calibration data for the end effector into an LUT of the PLC. Even if it is relatively easy to load the calibration data into an LUT, this still presents an opportunity for error that may go undiscovered until one or more parts are machined or assembled out of specification.

In addition, because the end effector is designed as an integral unit, repairing the end effector may entail removing and shipping the entire end effector back to the equipment supplier even to diagnose a failure in, and to change, a relatively small part. To avoid down time, this means that the manufacturing system that is using the robotic control system may need to keep one or more spare end effectors on hand to swap out a broken end effector. Because end effectors are relatively expensive, this adds significant cost to the manufacturer that uses the robot system under a master control system.

Furthermore, to perform any tests on the end effector (e.g., a test after repair or after a software update), the tester must have an entire robot system, or at least a robot-system emulator. This adds expense, and may require a large space because the robot is typically large.

Various embodiments of the inventive self-contained modular manufacturing device address these disadvantages by providing a system and method of handling control aspects and calibration aspects of the end-effector using a modular device having a dedicated processor for controlling the actions of the end-effector in a self-contained manner. In this aspect, problems associated with bulky and remote master control system are eliminated. Further, the modularity of the various portions of the overall manufacturing system is increased thereby reducing downtime and repair costs. These and other aspects of the subject matter disclosed herein are better understood with respect to the descriptions of FIGS. 1-5 below.

FIG. 1 shows an isometric view of a set of modular tools forming a self-contained modular manufacturing device 100 having a local processor for executing processing instructions independent of an overall manufacturing control system according to an embodiment of the subject matter disclosed herein. The modular device 100 may include several modules 105-109 that are designed to interface with one or more other modules 105-109 within the modular device 100. In this manner, the set of modules 106-109 function as one device 100 within the larger context of a manufacturing control system. Further, each module 105-109 may include its own dedicated processor (not shown in FIG. 1) for controlling aspects of the functions of the individual module. In other embodiments, the modular device 100 may include its own local controller with several nested controllers embedded within dependent modules. In still further embodiments, each module 105-109 may be controlled by a single local processor embedded within one of the modules 105-109. For the purposes of this disclosure, the example embodiment having one local processor for controlling the aspects of each of the five modules 105-109 is discussed. Other embodiments may be the subject of related disclosures focused on nested controllers and the like.

Thus, in this embodiment, there are five modules 105-109 that collectively form a self-contained modular manufacturing device 100 that is a fastener delivery and actuating tool 100. This will be the example embodiment that is discussed throughout the remainder of this disclosure, but the skilled artisan understands that there can many several other examples of self-contained modular manufacturing device 100. The five modules 105-109 of the modular device 100 include an x-y-axis motion-actuator assembly 105 (hidden from view in FIG. 1—see FIG. 2 for greater detail), a motor-spindle assembly 106, an end-effector assembly 107 (as shown in FIG. 1, a fastener torque assembly), a y-axis carriage assembly 108, and a fastener-delivery assembly 109. Collectively, these five modules 105-109 may be controlled by one or more self-contained processors (not shown in FIG. 1) embedded in one or more of the five modules.

The self-contained processor may include programming with executable routines and sub-routines for controlling each of the modules 105-109. For example, a first sub-routine may be programmed for maneuvering the modular device along an x-axis rail (by controlling the x-y-axis motion-actuator assembly 105, and along a y-axis rail (by controlling the x-y-axis motion-actuator assembly 105 and the y-axis carriage assembly 108). A second subroutine may be programmed for selecting and delivering a specific fastener using the fastener-delivery assembly 109. A third subroutine may be programmed to control the motor-spindle assembly 106 to apply the appropriate drive force to the end-effector assembly 107. Lastly, a fourth subroutine may be programmed to control the end-effector assembly 107 to apply the appropriate torque to the fastener that has been selected. Additional subroutine may also assist with the overall control of the self-contained modular manufacturing device 100.

The self-contained modular manufacturing device 100 may also communicate with a master control system as well. In this sense, the self-contained modular manufacturing device 100 may hand off control to a master control system until appropriate times and then be handed local control at the self-contained modular manufacturing device 100 so that the specific functionality of the device 100 can be accomplished, Such a back and forth nature is often called a control handshake wherein a master control system need not be aware of what the self-contained modular manufacturing device 100 is doing—rather the master control system need only be aware that the self-contained modular manufacturing device 100 is doing its thing.

Such communication may be realized through an umbilical cord 110 having a communication link, such as RS-232 or standard Ethernet. Further, the umbilical cord 110 may also have cabling for power to the various modules 105-109 of the self-contained modular manufacturing device 100. In another embodiment, communication between the self-contained modular manufacturing device 100 and a master control system may be realized through wireless communications using common wireless communication protocols such as IEEE 802.11 and the like. Further, such a wireless embodiment may also include self-contained battery power such that any need for an umbilical cord 110 is eliminated. Additional details about each module 105-109 in the self-contained modular manufacturing device 100 are presented next with respect to FIG. 2.

Figure 2:
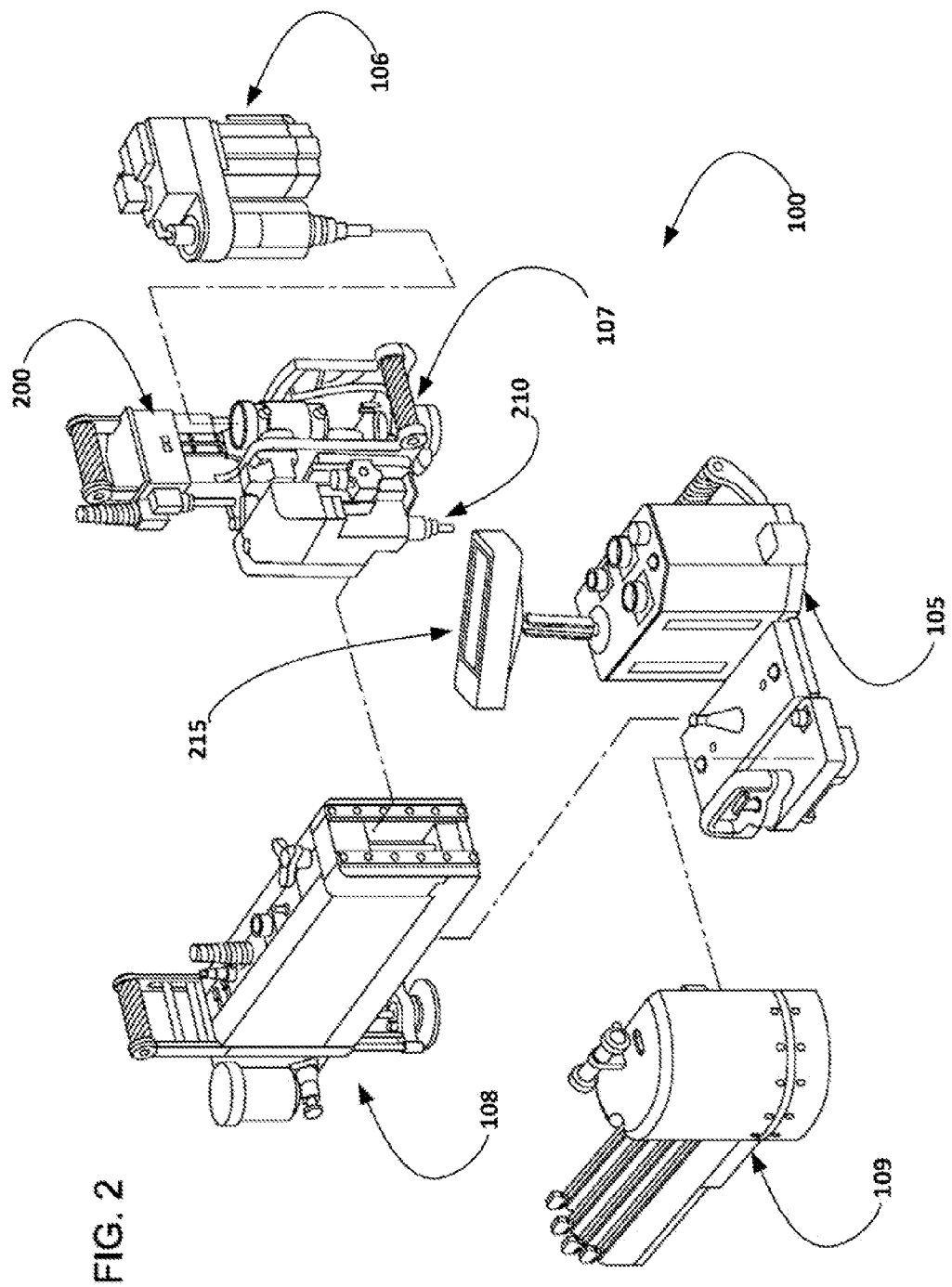
FIG. 2 shows an exploded diagram of the isometric view of FIG. 1 showing the set of modular tools that form the self-contained modular manufacturing device of FIG. 1 according to an embodiment of the subject matter disclosed herein.

FIG. 2 shows an exploded diagram of the isometric view of FIG. 1 showing the set of modular tools that form the self-contained modular manufacturing device 100 of FIG. 1 according to an embodiment of the subject matter disclosed herein. This exploded view also shows each of the five modules 105-109 from the example embodiment discussed above. As mentioned before, these modules include an x-y-axis motion-actuator assembly 105, a motor-spindle assembly 106, an end-effector assembly 107, a y-axis carriage assembly 108, and a fastener-delivery assembly 109. Collectively, these five modules 105-109 may be controlled by a self-contained local controller 200 embedded in the end-effector assembly 107. Thus, the local controller 200 may be a processor programmed to include routines and subroutines (which may be stored in a local memory not shown in FIG. 2) for controlling each of the modular sections of the self-contained modular manufacturing device 100.

The modular device may include an x-y-z drive system that may include one or more drive assemblies for actuating an end effector to an x-direction, a y-direction and a z-direction. For example, the modular device 100 may include an x-y-axis motion-actuator assembly 105, (for example, a screw-type drive assembly) that translates the end-effector 107 relative to a mount (such as a robot arm) in an x-direction and in a y-direction. Further, the modular device 100 may include a y-axis carriage assembly 108, (again for example, a screw-type drive assembly) that carries the end-effector 107 relative to the mount in the y-direction. Further yet, the modular device 100 may include a z-axis motion-actuator assembly (not shown in FIG. 2) that translates the end-effector 107 relative to the mount in a z-direction. Alternatively, one or more drive assemblies may translate the end-effector 107 in only one or two dimensions. Additionally, sensors (not shown in detail) coupled to the local controller 200 may provide feedback signals to the local controller 200 so that the local controller 200 can control various items via a closed loop control path. For example, a sensor may sense the x position of the x-y-z drive assembly such that the local controller 200 can stop movement of the drive in the x direction when the x-y-axis actuator assembly 105 attains the desired x-position.

The drive assemblies may be controlled by the local controller 200 to position the end-effector 107 in a position to accomplish its underlying function; in this case, the underlying function is to fasten one piece of metal to another piece of metal using a selected fastener. Thus, the local controller 200 may execute a sub-routine for positioning the end-effector 107 at a precise location with respect to the first and second pieces of metal. Further, the various drive assemblies that are part of the modular device 100 may be used for granular positioning while the local controller 200 may be in communication with a robotic arm to which the modular device 100 is mounted in order to control broader movement. For example, the local controller 200 may send signals to a robotic arm to move the modular device 100 to a general location, but then use the drive assemblies such as modules 105 and 108) within the modular device 100 to move the end effector to a precise location.

The end-effector 107 may further include a tool selection assembly such as a turret module 210 that is configured to position different tools or end-effectors that may be attached to the turret module 210 into a working position or other position. In other embodiments, the tool selection assembly may be a linear selection device. Further yet, the tool selection assembly may be a combination of different tool selection devices. Examples of end-effectors that can be attached to the turret module 210 include a drill assembly, a camera assembly (to image, e.g., a drilled hole for analysis), a hole-depth determiner, a counter-sink-depth determiner, a fastener inserter, and a fastener installer. The turret module 210 may include a motor that rotates the turret to position a selected one of the tools in a work or other position, such as positioning the drill to drill a hole.

The modular device 100 of FIG. 2 includes a fastener-delivery assembly 109 that may include a fastener-orientation mechanism that can properly orient and load fasteners for use at the end-effector 107. The fastener-load mechanism may receive from the master-controller 200 information identifying the size of the fastener to be delivered, or the mechanism may effectively be able to determine the size without input from the local controller 200. Moreover, the tools on the turret module 210 may themselves be modular and self-contained with a controller. For example, one may be able to replace the drill, which includes a spindle motor assembly 106 and local motor controller (not shown), independently of the other tools in the overall modular device 100. The modular device 100 of FIG. 2 includes a human-machine interface 215 configured to provide a graphic user interface for local programmatic control of the device independent of the master control system.

In general, the end-effector assembly 107 includes a local controller 200 that, e.g., handles communications to/from the master control system and that controls one or more next-level sub-controllers within the modular device 100. For example, the local controller 200 may execute software that translates commands from the master control system into control signals or commands to sub-controllers in the end effector, assembly 107 or other assemblies in the modular device 100 and that translates commands from the various sub-controllers to the master control system. Such simple commands from the local controller 200 may simply be to begin the modular device function such that control is relinquished to the local controller 200 for accomplishing said function. Then, after said function is complete, the local controller 200 may communicate to the master control system that said function is complete and that control is relinquished back to the master control system.

There are several advantages realized in a self-contained modular system of FIGS. 1 and 2. First, the master control system, which is often a PLC, may have programming instructions that can be shortened and simplified as various commands to and from a coupled modular device 100 need only be minimal. Further, such PLC instructions at the master control system level need to be modified (or tested, debugged, and reinstalled) at all when software/firmware on board the modular device 100 is modified.

Second, the PLC of the master control system can send commands to the modular device 100 instead of analog or digital signals. This allows the connector 110 (e.g., "umbilical cord") between the PLC and the modular device to be reduced to incorporating an Ethernet connection (e.g., CAT 6) and a power connection. By reducing the number of individual connections, the connector is smaller, less complex, and more reliable. Additionally, the modular device 100 may run from 110 VAC instead of a specialized supply voltage like 408 VDC.

Third, the modular device 100 may store its own calibration data and may calibrate itself independently of the PLC of the master control system. This relieves the PLC memory of the burden of storing a calibration LUT for each possible modular device 100 in the system, and also eliminates the need to update such various LUTs when a modular device 100 is switched out. That is, swapping out an end-effector assembly 107 is now transparent to the PLC of the master control system because it requires no updates to the PLC software or stored calibration/configuration data.

Third, because the modular device 100 is designed as a modular unit, repairing the end-effector assembly 107 or other assembly in the modular device 100 entails shipping only the defective module back to the equipment supplier. This means that to avoid down time, the entity using the modular device system may need to keep only spare modules, not entire spare robots on hand to swap out with a broken or defective assembly or module. Furthermore, tests (e.g., a test after repair or after a software update) can be performed on the end-effector assembly 107 independently of the remainder of the robot system. Therefore, the tester need not have an entire master robot system or a robot-system emulator.

Figure 3:
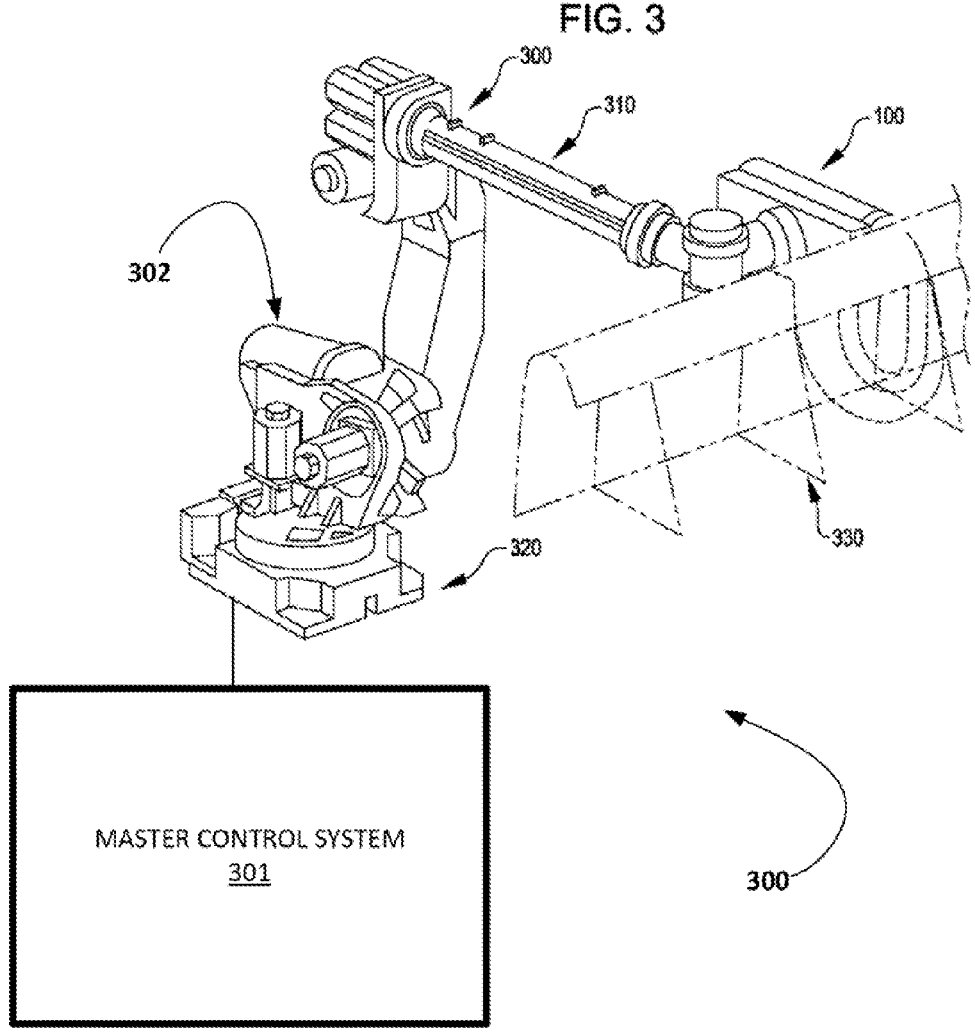
FIG. 3 shows an isometric view of an overall control system set in a manufacturing environment that includes the self-contained modular manufacturing device of FIG. 1 according to an embodiment of the subject matter disclosed herein.

FIG. 3 shows an isometric view of an overall robotic control system 300 set in a manufacturing environment that includes the self-contained modular manufacturing device 100 of FIG. 1 according to an embodiment of the subject matter disclosed herein. The system 300 includes a master control system 301 that may be a PLC or other programmable processor that is configured to control various robotic and automated subsystems within the overall robotic control system 300. In FIG. 3, only one subsystem 302 is shown for simplicity, but a skilled artisan understands that the system 300 may include multiple subsystems.

The subsystem 302 shown in FIG. 3 shows a robotic stanchion 320 that has a robotic arm 310 mounted in a movable manner to the robotic stanchion 320. Thus, under control of the master control system 301, the robotic arm may be maneuvered in several directions and degrees of freedom to place a mounted modular manufacturing device 100 into a position near an underlying manufactured item, such as the ribbed structure 330 shown in FIG. 3. In an embodiment, the self-contained modular manufacturing device 100 may take control of the robotic arm 310 if control is relinquished by the master control system 301. Such a control handshake is described above and not repeated in detail here.

Figure 4:
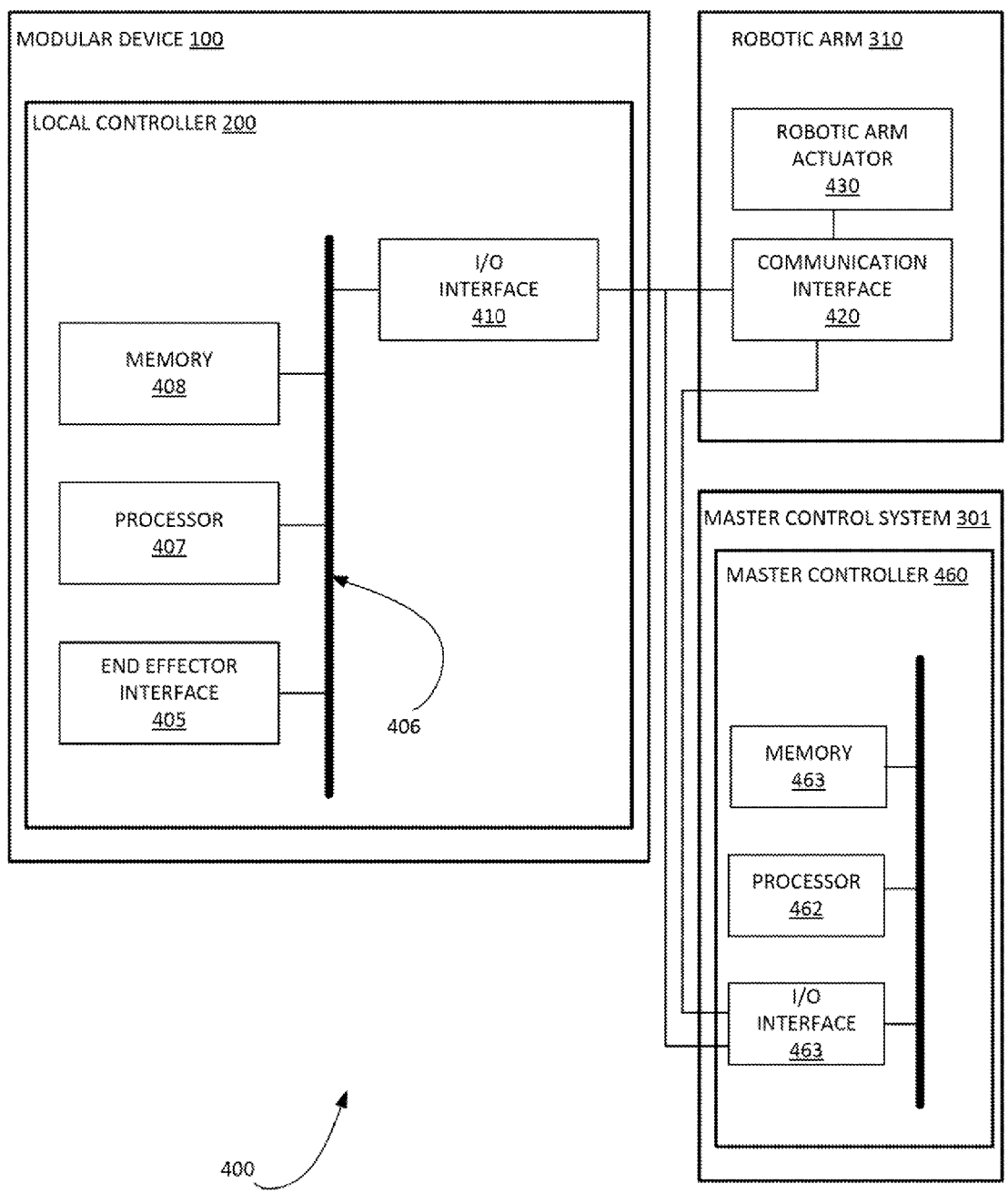
FIG. 4 shows a block diagram of an overall control system set in a manufacturing environment that includes the self-contained modular manufacturing device of FIG. 1 according to an embodiment of the subject matter disclosed herein.

FIG. 4 shows a block diagram of the system 300 of FIG. 3 set in a manufacturing environment that includes the self-contained modular manufacturing device 100 of FIG. 1 according to an embodiment of the subject matter disclosed herein. In this block diagram, the self-contained modular manufacturing device 100 includes the local controller 200 described above for controlling actions and functions of the self-contained modular manufacturing device 100 and, at times, the robotic arm 310. The local controller includes a processor 407 configured to execute instructions that may be stored in a local memory 408. The memory 408 is coupled to the processor via a communication and data bus 406. The bus 406 is also coupled to one or more interfaces 405 for one or more end-effectors. In other embodiments, the interface 405 may be for coupling additional modular devices (not shown) or other devices in a nested controller manner.

The modular device controller 200 also includes an input/output interface 410 suitable for handling communication signals to and from other related manufacturing devices and controllers in the system 300. In this embodiment, the I/O interface 410 is communicatively coupled to a communication interface 420 housed within the robotic arm 310. In other embodiments, the communication interface 420 may be within a stanchion 320 of the robotic arm as shown in FIG. 3 or may be in direct communication with the master control system 301. The communication protocol for these devices may be standard Ethernet using TCP/IP protocol. Other embodiments may be a proprietary communication protocol, such as a proprietary "Smart Tool Protocol" (STP), using TCP/IP Ethernet or other standard serial or parallel interfaces (e.g., RS-232 or the like).

The communication interface 420 associated with the robotic arm may be coupled to one or more robotic actuators configured to move the robotic arm 310 in one or more direction or orientations (such as pivoting or rotating). The master control system 301, in turn, may include a master controller 460 that includes an I/O interface 461, a processor 462 and a memory 463 for accomplishing master control tasks and functions. Various methods may be realized using the system 300 of FIG. 3 which is exemplified in the block diagram of FIG. 4; an embodiment of one method is described next with respect to FIG. 5.

The local controller 200 of FIG. 4 may be configured to use historical data stored in the local memory 408 when controlling various functions of the modular device 100. Historical data may be any information related to a past performance of one or more functions of the end-effector 107 or any other module associated with the modular device 100. Generally, after the modular device 100 performs a function, data about the performance may be stored in a database of historical performance information in the memory 408. Such historical performance data may include performance data about one or more end-effectors in the modular device. The historical data may correspond to the total number of functions performed by an end-effector 107. This may be useful in setting various parameters of the functionality of the end-effector 107. For example, an end-effector 107 that drills a hole has a drill bit that may become more and more worn after each use. By keeping track of the number of uses, the force behind the drill bit may be increased according to a wear function corresponding to the type of bit. In this manner, as the drill bit become more worn over time, a z-axis actuator may compensate for the reduced drilling capability by providing a greater thrust. A related historical data point may include total uses since last maintenance, last calibration or last parts replacement.

In another embodiment, the parameter measured and stored over several performances may be the total function time necessary to accomplish the task. Thus, continuing the example of a drill bit, the total time needed to drill through an underlying manufactured item may be tracked to see if there exists any trends or variances. A large variance in function time may be indicative of a failure in the end-effector 107 or a flaw with the underlying manufactured item. Related to average function time being tracked is average force needed by an actuator in terms of Newtons or average current drawn by an electro-mechanical device. Again, any deviance (e.g., one or two standard deviations) from an average may be indicative of a problem. Such averages may also be weighted by time since last calibration or maintenance or take advantage of a moving average that discounts data that is older. In this respect, collected data may be appended to already collected data in the memory 408. Further, duplicate data may be ignored or older data may be culled from the data stored in the memory 408.

In still other embodiments, historical data being tracked may correspond to parameters and aspects of the underlying manufactured item. Thus, each underlying manufactured item may have tracking and identification data associated therewith. When the end-effector 107 performs a function on the already tracked underlying manufactured item, the very fact that this end-effector 107 performed its function on this particular item may be stored as historical data in the memory 408 of the modular device 100. Thus, each modular device 100 can maintain a history of exactly which items it helped manufacture. In this respect, during quality checks and the like, specific batches of items that are defective may be traced back to a specific end-effector 107 or modular device 100. In a related manner, each modular device 100 may save data corresponding to specific location on an underlying manufactured item in which a function was accomplished. Thus, a mapping of an airplane fuselages joints may be stored by the very machine that riveted the joints together.

Collectively, any single historical data point that is stored in the memory 408 of the modular device 100 may be used to affect the functionality of the modular device 100 the next time the modular device 100 performs the function. That is, the local controller 200 disposed in each modular device 100 or end-effector 107 is configured to control the functionality of the end-effector 107 in response to the stored historical data in the local memory 408.

Figure 5:
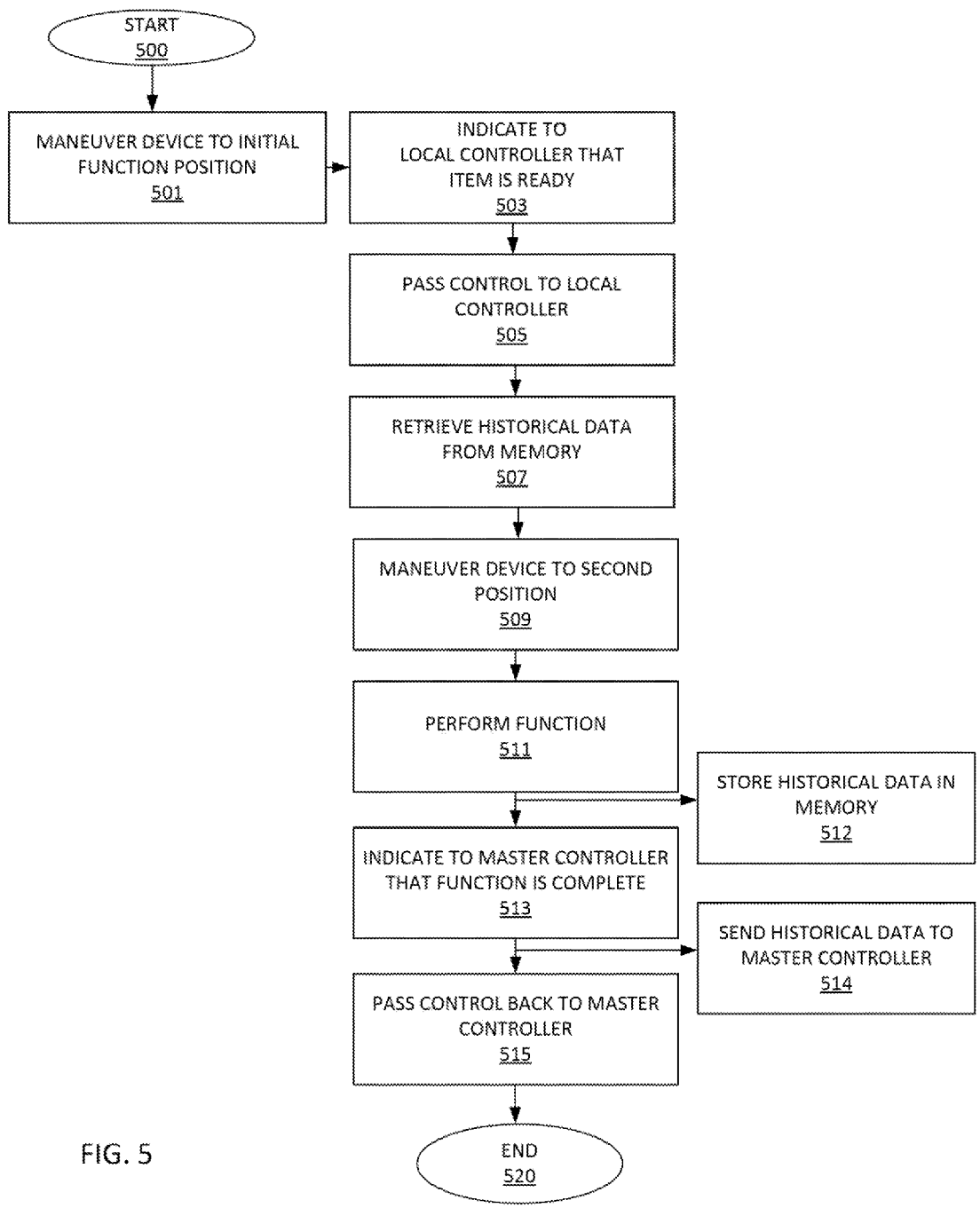
FIG. 5 shows a flow diagram of a method for using the self-contained modular manufacturing device of FIG. 1 responsive to locally stored historical data according to an embodiment of the subject matter disclosed herein.

FIG. 5 shows a flow diagram of a method for using the self-contained modular manufacturing device 100 of FIG. 1 according to an embodiment of the subject matter disclosed herein. The method described with respect to the flow diagram of FIG. 5 is for an underlying manufacturing function for drilling and fastening together two pieces of metal that are being held by tooling. The order and number of steps, and the steps themselves, may be different in other embodiments.

The method begins at step 500 and proceeds to a first step 501 wherein an underlying manufactured item may be ready to have a function performed on the item by the modular device 100. Thus, the underlying manufactured item may have been moved into a ready position, or the robotic arm system hosting the modular device 100 may be moved to a general area near the underlying manufactured item. Once on the ready position, the master controller 460 may indicate to the modular device 100 that the modular device is in the ready position at step 503. At step 505, the local controller 200 assumes local control of the modular device 100. Such local control may include control over the robotic arm in which the modular device 100 is attached.

In this embodiment of the method, the local controller 200, at step 507, may then access the local memory 408 to retrieve one or more historical data points about previous functions accomplished by the this modular device 100. As discussed above, the historical data may be calibration information about the last function performed. Thus, in response to the historical calibration information retrieved, the local controller 200, at step 509, may then maneuver a modular device to a calibrated (second) position with respect to an underlying manufactured item so as to accomplish the function more accurately or efficiently. In other embodiments, the historical data may be usage information about the previous functions performed. Thus, in response to the historical usage information retrieved, the local controller 200 may then maneuver a modular device to a compensated (second) position with respect to an underlying manufactured item so as to accomplish the function more accurately or efficiently after taking into account wear on the device 100 or end-effector 107. Other embodiments are contemplated but not repeated or discussed in detail here.

Next, at step 511, the local controller accomplishes the manufacturing function after the positioning or calibrating that was responsive to retrieved historical data. Once the function has been accomplished, an indication of the completed function may be sent from the local controller to the master controller 460 at step 513. At step 515, the local controller passes control of the self-contained modular manufacturing device 100 back to the master controller 460. Once all functions have been accomplished, the method ends at step 520. Additional steps may be added in other embodiments, such as additional control handshakes with nested controllers as well as multiple functions at the same position, such as drilling and measuring a hole. Further, the steps of this method need not be performed in exactly the order depicted in FIG. 5 and some steps may be omitted. The above example is just one illustrative example out of many illustrative examples.

As but one example of additional steps in the method of FIG. 5, after accomplishing the function, the historical data in the memory may be updated or appended with new information corresponding to the function just accomplished. This may be step 512 between steps 511 and 513. As another example, the local controller 200 may also communicate some or all of the historical data from the local memory 408 to a master control system remote from the modular device. This may be step 514 between steps 513 and 513. Generally speaking and by way of non-limiting example, the historical data may be a depth of a hole, a diameter of a circular hole, a dimension of a hole, a measurement from an edge of a member, a location of a joint between members, a temperature of an area of an underlying manufactured item, a distance between members, a distance between a member and the end-effector, or a material strength characteristic of an underlying manufactured item. Many other examples are contemplated but not discussed herein for brevity.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A method, comprising:
   maneuvering a self-contained modular manufacturing device to a first position with respect to an underlying manufactured item, the maneuvering controlled by a master controller remote from the self-contained modular manufacturing device;
   indicating to the self-contained modular manufacturing device that the self-contained modular manufacturing device is in the first position;
   assuming control of the self-contained modular manufacturing device with a local controller disposed in the self-contained modular manufacturing device;
   retrieving historical data about previous manufacturing functions accomplished by the self-contained modular manufacturing device from a memory disposed in the self-contained modular manufacturing device;
   maneuvering a self-contained modular manufacturing device to a second position with respect to an underlying manufactured item in response to the historical data retrieved;
   accomplishing the manufacturing function, the accomplishing controlled by the local controller;
   indicating to the master controller that the self-contained modular manufacturing device has accomplished the manufacturing function;
   passing control of the self-contained modular manufacturing device back to the master control system; and
   maneuvering the self-contained modular manufacturing device away from the position, the maneuvering controlled by the master controller;
   wherein the historical data comprises data from the group comprised of: a depth of a hole, a diameter of a circular hole; a dimension of a hole; a measurement from an edge of a member; a location of a joint between members; a temperature of an area of an underlying manufactured item; a distance between members; a distance between a member and the end-effector; and a material strength characteristic of an underlying manufactured item.

2. The method of claim 1, further comprising appending the historical data in the memory in response to accomplishing the function.

3. The method of claim 1, further comprising communicating the historical data to a remote master control system.

4. The method of claim 1, further comprising altering the historical data corresponding to at least one previously calibrated position of the end-effector with respect to an underlying manufactured item in response to accomplishing the function.

5. The method of claim 1, further comprising updating an accumulated usage of the end-effector in terms of previous functions accomplished.

6. The method of claim 1, further comprising updating at least one measurement of time needed to accomplish the function during a previous functional use.

7. The method of claim 1, further comprising enabling the local controller to manipulate the actuator.

8. The method of claim 1, further comprising appending the historical data after accomplishing a set of manufacturing functions.

9. The method of claim 1, further comprising culling the historical data of duplicate data in response to accomplishing the manufacturing function.

10. The method of claim 1, further comprising adjusting the accomplishing of the manufacturing function in response to the retrieved historical data.

* * * * *